United States Patent
Davis

[11] Patent Number: 5,348,563
[45] Date of Patent: Sep. 20, 1994

[54] AIR PURIFYING APPARATUS

[75] Inventor: George B. Davis, Frederick, Md.

[73] Assignee: Honeywell Inc., Minneapolis, Minn.

[21] Appl. No.: 82,941

[22] Filed: Jun. 29, 1993

[51] Int. Cl.$^5$ .................... B01D 46/02; B01D 53/04
[52] U.S. Cl. ......................... 55/385.2; 55/471; 55/472; 55/473; 55/484; 55/500; 96/135; 96/136
[58] Field of Search ............... 55/385.2, 471, 472, 55/473, 484, 497, 498, 500; 96/131, 133, 135, 136

[56] References Cited

U.S. PATENT DOCUMENTS

| | | |
|---|---|---|
| 845,044 | 2/1907 | Baldwin . |
| 4,121,916 | 10/1978 | Fricke . |
| 4,526,592 | 7/1985 | Armbruster . |
| 4,547,208 | 10/1985 | Oace . |
| 4,629,482 | 12/1986 | Davis . |
| 4,846,859 | 7/1989 | Nobiraki et al. . |

Primary Examiner—Charles Hart
Attorney, Agent, or Firm—Ian D. MacKinnon

[57] ABSTRACT

A ceiling mounted air purifier that provides a high velocity, multi-directional air exhaust pattern that distributes filtered air to all areas of a room which includes a plurality of filters and centrifugal fans. The centrifugal fans are substantially surrounded by baffles which form generally equally spaced exhaust outlets.

15 Claims, 3 Drawing Sheets

AIR PURIFYING APPARATUS

BACKGROUND OF THE INVENTION

1. Field of the Invention

This invention relates to room air cleaners or purifiers, and, more particularly, to an air cleaner that is mounted to a ceiling or a similar overhead surface in a room, and that provides a high velocity, multi-directional air exhaust pattern so as to circulate and filter substantially all of the air within the room.

2. Discussion of the Related Art

In recent years there has been a growing interest to improve environmental air conditions in homes and in commercial settings such as offices, restaurants, laboratories, hospitals and the like. As more information has been made available to the public concerning the hazards of indoor pollution, there has been an increased demand for filtering devices which can be used to effectively improve air quality.

As the number of indoor airborne pollutants has increased, an increased number of complaints of respiratory infections, burning eyes, allergies, asthma attacks and other symptoms have been directly attributed to the pollutants. One only need to consider the types of airborne particles which are inhaled by the average person on a daily basis in indoor environments to understand that the problem of airborne pollutants is ever increasing and its side effects growing. People are constantly inhaling particles of dust, smoke, pollen, molds, acids, bacteria, carbon and the like. Accordingly, it has become necessary in many environments, such as in hospitals, laboratories, scientific research rooms and the like, to provide filtering equipment which will substantially remove all airborne pollutants.

Consequently, a great demand has been made for products which can provide for clean air conditions both in homes and commercial settings. Unfortunately, many of the products which have been advertised, distributed and sold for individual consumers and businesses have not been effective. Although these products have been advertised as being capable of removing substantially all foreign particles from the air, in fact, such claims have not been supported by actual testing results. Some available room air cleaners utilize filtering materials which only remove perhaps up to 85% of the one micron or larger particles from the air. Such units do not remove smaller particles such as those contained in smoke and dust, and also do not adequately remove larger pollutants such as pollens and fungus spores.

The advent of high efficiency particulate air (HEPA) filters has provided an advantage over the known filter media in that HEPA filters more effectively remove pollutants from the air. In addition, it has been found that HEPA filters effectively operate for longer periods of time without becoming excessively clogged due to their increased pollutant retaining capacities. Therefore, these filters offer substantial cost savings to the consumer.

Although air cleaner units including HEPA filters are available, these units have not provided sufficient air circulation to meet the stringent requirements of larger, open commercial environments such as in hospitals, workshops, office space where personnel are separated by dividers, and laboratories. In these environments, it is necessary that air cleaners create an air flow such that essentially all of the air within a room is frequently circulated through the filter media to ensure the continuous removal of pollutants.

SUMMARY OF THE INVENTION

The present invention has been made in view of the above inadequacies of the prior art and has as an object to provide an air purifier apparatus which has a high velocity, multi-directional air exhaust pattern and which circulates and filters substantially all of the air within a room.

Another object of the present invention is to provide an air cleaner apparatus which is mountable to any ceiling or like overhead surface in household and commercial environments.

Additional objects and advantages of the present invention will become apparent from the following description and the accompanying drawing figures, or by practice of the invention.

To achieve the objects of the invention, as embodied and broadly described herein, the air purifier apparatus in accordance with the invention includes a base defining a plenum region having a plurality of spaced air inlet openings therein. A plurality of centrifugal fans for drawing air into the apparatus are located within the plenum region and are aligned with the air inlet openings. The fans are driven by separate motors. Electrical power is provided to the motors by direct or indirect wiring. Each of the fans are substantially surrounded by baffles. The fans and the baffles together create a space therebetween which defines a plurality of air exhaust outlets, and the different air exhaust outlets are substantially equally spaced with respect to each other.

A housing substantially encloses the base and includes air intake openings. A plurality of air filters are mounted within the housing and exterior to the plenum region. The filters are sealed in a surrounding relationship to the air inlet openings so that all incoming air being drawn by the filters must pass through the filters before being exhausted through the discharge outlets.

Operation of the air cleaner apparatus causes air to be drawn through the filters and then exhausted to substantially all areas of the room through the air exhaust outlets.

DETAILED DESCRIPTION OF THE PREFERRED EMBODIMENT

Reference will now be made in detail to the preferred embodiment of the invention, as illustrated in the accompanying drawings.

Figure 1:
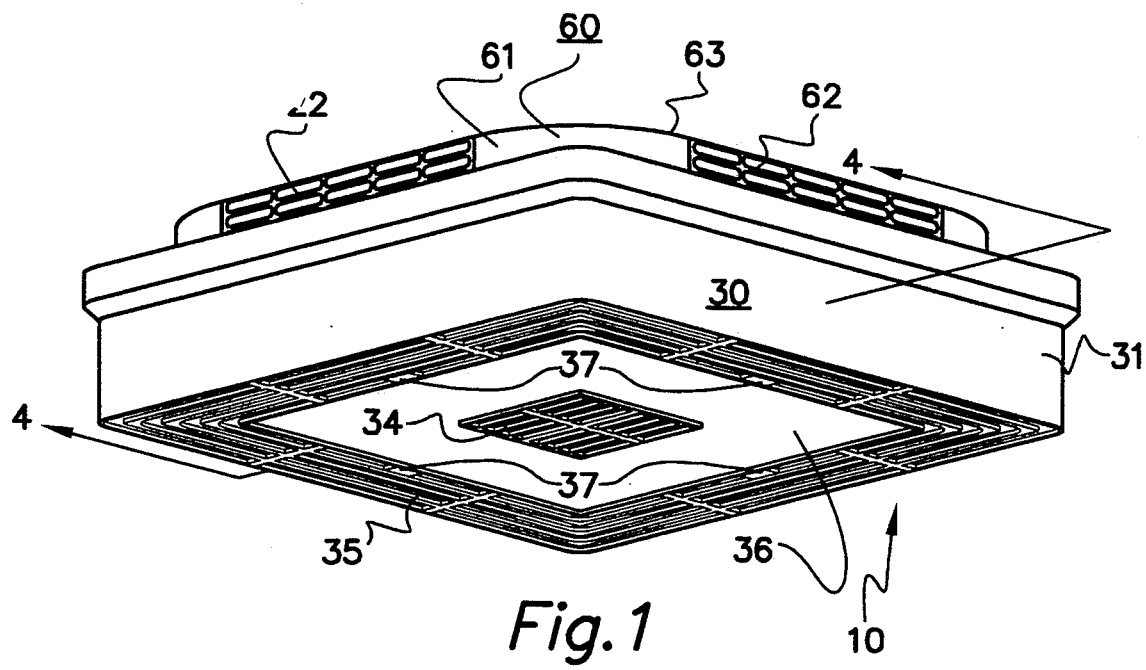
FIG. 1 is a bottom perspective view of an air purifier in accordance with the present invention.
Figure 3:
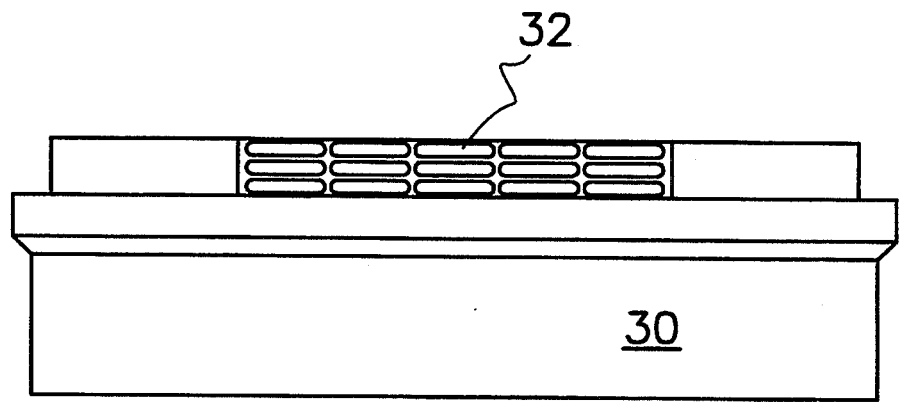
FIG. 3 is a side elevational view of the air purifier as illustrated in FIG. 1.

With reference to the drawings, FIG. 1 illustrates an air purifier 10 in accordance with the present invention. As further illustrated in FIG. 2, the air purifier 10 comprises a base 11 including a top plate 12 and a bottom plate 12'. The bottom plate and the top plate are both preferably square or rectangular shaped, of about the same dimensions, and arranged in a parallel relationship with respect to each other. The space defined between the two plates is referred to hereinafter as the "plenum region" 13 because the pressure of the air between the plates is greater than that of the atmosphere outside of that region.

The top plate 12 can be mounted to any ceiling construction or style, acoustical tile, or like overhead surface having a substantially flat surface, using conventional fasteners such as screws or clips (not shown).

Figure 5:
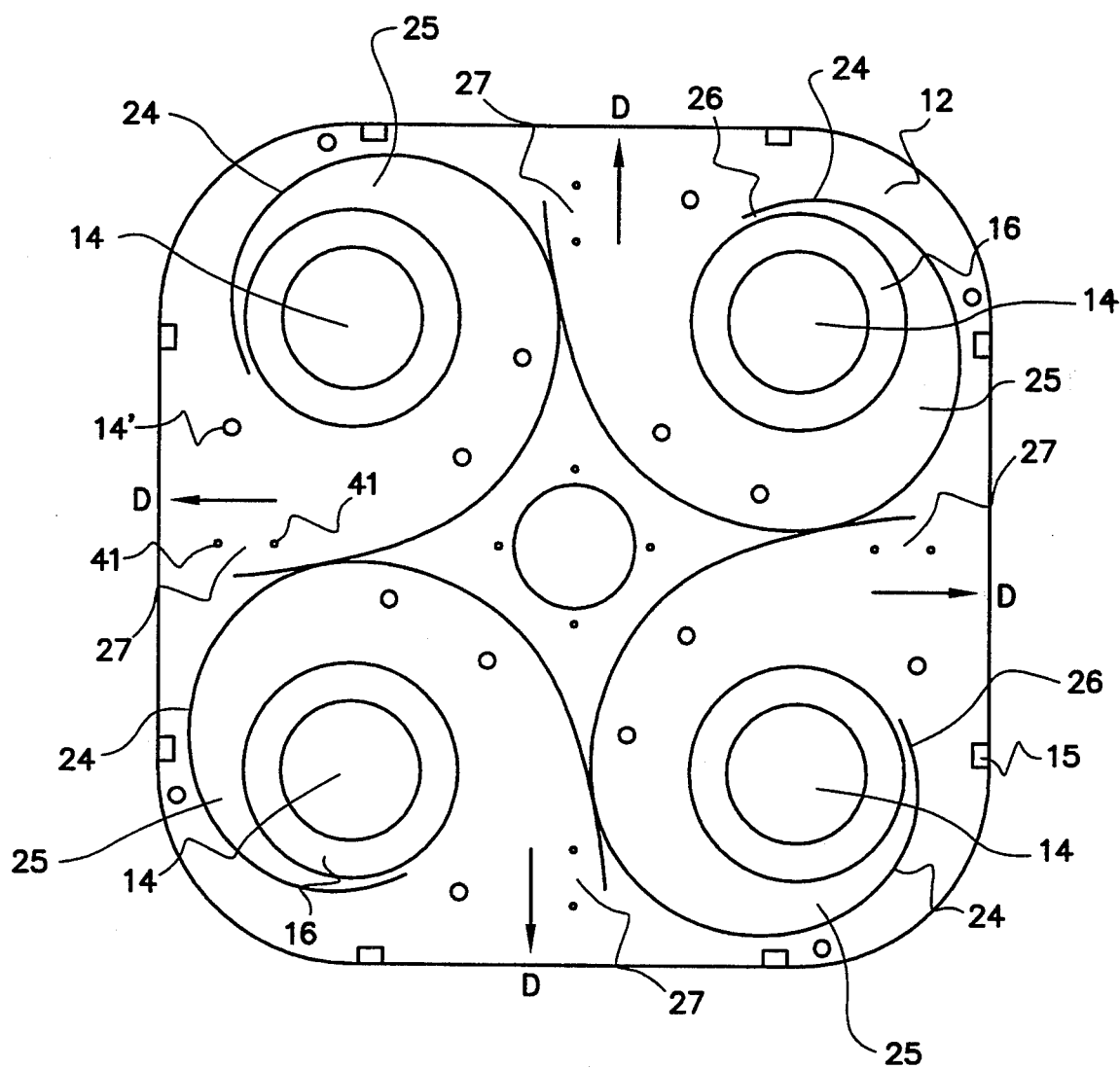
FIG. 5 is a cross-sectional view taken along the direction of line 5—5 of FIG. 4.

The bottom plate 12' of the base includes a plurality of openings 14 and 14', as illustrated in FIG. 5, that will be described in greater detail below.

Figure 2:
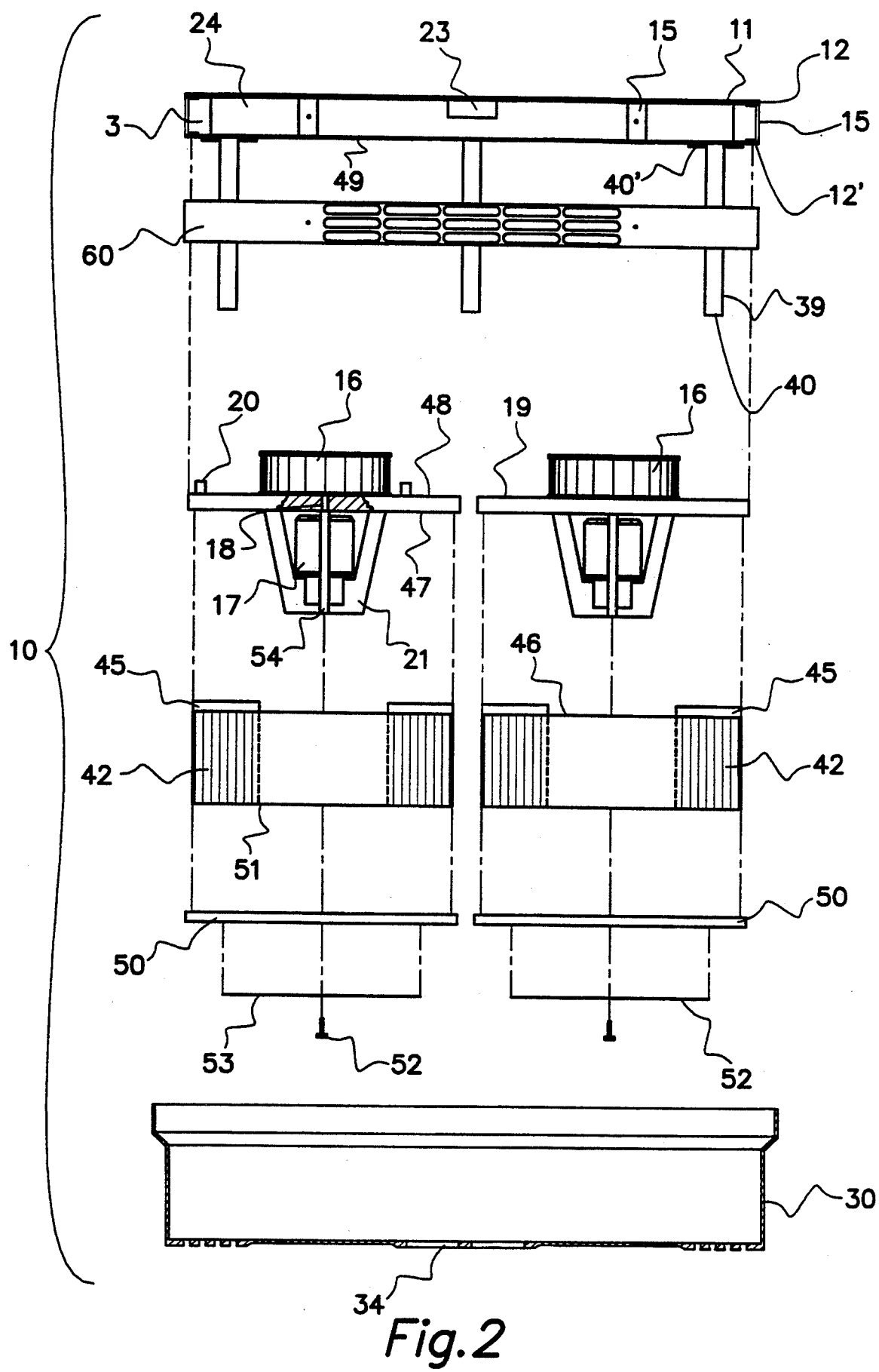
FIG. 2 is an assembly view of an air cleaner or purifier in accordance with the present invention.

The top plate and the bottom plate are connected to each other by first spacers 15 extending between the two plates. As embodied herein, the first spacers preferably include a plurality of U-shaped brackets as best illustrated in FIG. 2. As shown in FIGS. 2 and 5, the brackets are positioned adjacent to the side edges of the top plate 12 and the bottom plate 12', respectively. The first spacers may optionally comprise conventional fasteners such as bolts or the like positioned at these same locations.

The top plate and the bottom plate are preferably both composed of an aluminum or other lightweight metal, or plastic material.

The air purifier in accordance with the present invention further includes a plurality of fans 16 for drawing the room air into the apparatus. As embodied herein, the fans are preferably centrifugal fans. The fans extend through the air inlet openings 14 in the bottom plate 12' and are located within the plenum region 13 when the air purifier is in an assembled condition. Preferably, four centrifugal fans are arranged within the plenum region in a symmetrical arrangement with respect to the bottom plate 12' and adjacent to the four corners of the base. The four centrifugal fans are each inserted through one of the air inlet openings 14 as illustrated in FIG. 5. These four openings are arranged symmetrically with respect to the bottom plate, and accordingly, so also are the centrifugal fans.

The centrifugal fans each include a plurality of radially extending and equally spaced blades (not shown) having a slight curvature along their lengths. The blades all lie in a plane that is substantially perpendicular to the top plate 12 and the bottom plate 12'. The rotation of the blades draws air through the openings 14 and thereafter exhausts the air uniformly as will be discussed in greater detail below.

The air purifier further includes motors 17 for driving the centrifugal fans. As embodied herein, the motors are relatively low-horsepower-type electrical motors having drive shafts 18 to which the centrifugal fans are mounted. The drive shafts of the motors extend through a support plate 19 associated with each motor and into the plenum region 13. The support plates include attached support lugs 20. When the fans 16 are inserted through the air inlet openings 14 in the bottom plate 12', the lugs are received within the openings 14' in the bottom plate so as to prevent relative motion between the support plate and the bottom plate. The support plates are secured to the bottom plate by welding or otherwise fastening the lugs to the bottom plate. The motors may have variable speeds to offer variable rates of air flow so that the air purifier apparatus may be used in rooms of different sizes, or in rooms having different concentrations of airborne contaminants.

The motors 17 are mounted to the support plates 19 preferably by mounting brackets 21 which are connected at one end to the support plates. The number of motors in the apparatus may be varied, and preferably there are four motors, each having a centrifugal fan associated therewith.

The air purifiers in accordance with the present invention further include means for relaying electrical power to the motors. As embodied herein, the relaying means includes a first electrical power input 22 (see FIG. 1) attached to a side wall 61 of a cover plate 60 that surrounds the sides of the base 11. The first, or indirect, electrical power input includes a socket (not shown) to receive a plug of an extension cord or the like that may be plugged into an electrical outlet in the room. The first electrical power input is provided so that the air cleaner apparatus may be used in rooms without ceiling-related electrical wiring. Power is provided to the motors 17 by electrical conductors (not shown) connected to the first electrical power input and to each of the motors.

The relaying means preferably further includes a second, or direct, electrical power input 23 mounted to the top plate 12 of the base within the plenum region (see FIG. 2). The second electrical power input is provided so that the apparatus may be electrically connected directly to any ceiling-related wiring in the room. The second electrical power input is preferably located at a central region of the top plate. The second electrical power input 23 is also electrically connected to the motors.

In accordance with the present invention, the air purifier includes baffles 24 (see FIG. 5) that are located within the plenum region and which substantially surround each of the centrifugal fans 16. The baffles are arcuately shaped and have a height equivalent to the distance between the top plate and the bottom plate as illustrated in FIG. 2. As illustrated in FIG. 5, the baffles and the centrifugal fans 16 define an arcuate, gradually opening channel 25 therebetween. The air exhausted from the fans is directed along the channels to air exhaust outlets 27 from which the air is exhausted to the room. The progressively increasing channels 25 allow for the increased volume of the air in the direction of rotation of the fans. Further, the inner edge 26 of the baffles is located in close proximity to the fans so as to prevent ambient air from being drawn into the fan. Thus, the fan draws substantially all air through the openings 14. This configuration of the baffles thus reduces the amount of exhausted air that could be drawn back toward the fan instead of being exhausted out through the air exhaust outlet as intended.

As illustrated in FIG. 5, the air exhaust outlets 27 are preferably substantially equally spaced with respect to each other. This substantially equally spaced arrangement of the air exhaust outlets provides multi-directional discharge air patterns in the directions of the arrows D, which purge pollution from all of the corners and other areas of the room. In the arrangement shown in FIG. 5, the adjacent air exhaust outlets are oriented substantially perpendicularly relative to each other. The air purifier apparatus may comprise a different number of centrifugal fans and baffles than four. In those instances, the adjacent air exhaust outlets would be substantially equally spaced with respect to each other, but would not have a substantially perpendicular relationship.

In accordance with the present invention, the air purifier apparatus further includes a housing 30 that preferably has a rectangular shape as illustrated in FIG. 1, and preferably is molded of a plastic material. The housing preferably includes four side walls 31 and a bottom wall 32 that defines a central air intake opening 34 and peripheral air intake openings 35. A plenum cover plate 60 includes four side walls 61 having air exhaust openings 62 for exhausting filtered air to the room. The air exhaust openings are located in direct communication with the air exhaust outlets 27. The peripheral air intake openings 35 are preferably located about the entire periphery of the bottom wall. The room air is drawn through the air intake openings 34 and 35 by rotation of the centrifugal fans.

The housing also includes openings 37 for receiving connectors (not shown) for connecting the housing to the base. As embodied herein, the connectors preferably comprise conventional fasteners such as screws, bolts or the like that are received by brackets 39 (FIG. 2) mounted to the bottom plate of the base. The brackets have threaded openings at their top faces 40 to receive the connectors. The brackets are preferably mounted to the bottom plate 12' of the base by conventional fasteners (not shown) which are passed through threaded openings (not shown) in legs 40' and openings 41 in the bottom plate. As illustrated in FIG. 5, there are preferably four pairs of such openings 41.

The air purifier also includes filter assemblies 42 for cleaning the room air that is drawn into the apparatus through the air intake openings 34 and 35. As embodied herein, a plurality of air filters are provided corresponding to the number of fans so that an air filter is associated with each fan.

Figure 4:
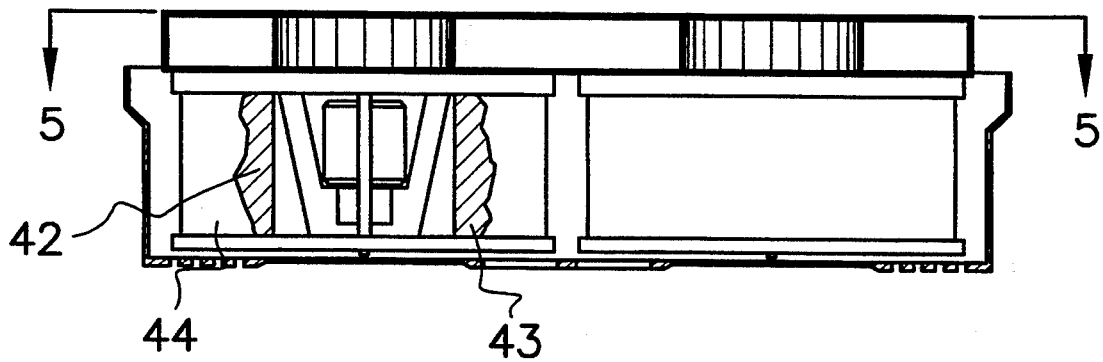
FIG. 4 is a cross-sectional view taken along the direction of line 4—4 of FIG. 1 including a broken-out section illustrating a portion of a HEPA filter.

The air filters preferably include cylindrical HEPA type filters 43 having a pleated structure as shown in broken-out section in FIG. 4. The HEPA filters provide a large surface area, and, accordingly, a large pollutant retention capacity. The HEPA filters preferably have an average efficiency of 95% relative to 0.3 micron and larger thermally-generated dioctyl phthalate (DOP) particles, and may optionally have a 99.97% efficiency. The air filters may optionally include sorbent media such as CPZ TM (composed of 60% charcoal, 20% alumina potassium permanganate and 20% zeolite) or a like substance to enhance their filtering performance. The optional sorbent media further enhances the performance of the HEPA filters which effectively remove dust, smoke, bacteria, pollens and other particulates, as well as gases, vapors and odors. The HEPA filters also have a high average life expectancy of approximately 12–18 months of service.

The filtering means may optionally also include cylindrical prefilter elements 44 arranged in a surrounding relationship with respect to the HEPA filters. The prefilters may be provided to remove relatively larger particulates from the air before those particulates contact the HEPA filters and cause them to prematurely become clogged. The prefilters thus enhance the capacity of the HEPA filters to capture the smaller particulates. The prefilters are preferably constructed of a washable material so that they may be cleaned and reused. The prefilters preferably have an inner diameter and height which closely correspond to the size of the exterior surface of the HEPA filters so that no additional support structure is necessary to retain the prefilters in place.

In accordance with the present invention, the air filters include annular seals 45 for sealing the filters in surrounding relationship to air inlet openings 14 defined by the bottom plate 12' of the base. As embodied herein, the seals may comprise a gasket or the like that forms a substantially airtight seal between a top of the filter assembly and the bottom face 47 of the support plate 19. An annular seal 50 is also placed over the bottom of each of the filter assemblies. A circular cover plate 53 closes the bottom of the filter assemblies and is held in place by a fastener 52 inserted through an opening in the cover and received by a threaded end 54 of the mounting bracket 21. The cover closes the open or lower end of the filter so that all air must pass through the filter media.

The space between the top face 48 of the support plate 19 and the bottom face 49 of the bottom plate 12' of the base is also sealed by a gasket or the like so that room air that is drawn into the interior of the apparatus cannot pass between the support plate and the bottom plate and enter the air inlet openings 14. Rather, all room air is forced to pass through the walls of the air filter media before entering the air inlet openings.

In operation, the motors drive the centrifugal fans to cause room air to be drawn into the air purifier apparatus from throughout the room. Air is drawn through the air intake openings in the housing and through the filters so as to remove most of the airborne particulates above 0.3 microns, as well as gases and vapors that may be harmful to people or have undesirable odors. The filtered air then passes through the air inlet openings 14 in the bottom plate of the base and into the plenum region where the centrifugal fans are located. The air is directed from the fans into the arcuate channels defined by the baffles at a high velocity and exits through the air exhaust outlets.

The air is exhausted to the room at a high velocity and in a multi-directional discharge air pattern so that the exhaust air circulates air throughout the room thus increasing the efficiency of the purifier to remove contaminants throughout the interior space of the room. The air cleaner apparatus preferably will purge pollution at distances of up to 25 feet and more away therefrom.

The high velocity, multi-directional air discharge pattern makes the air cleaner apparatus ideally suited for use in a wide array of commercial settings, including smoking rooms, offices, restaurants, beauty salons, cafeterias, laboratories, patient rooms, computer rooms, light industrial settings and the like, as well as in homes.

One air purifier in accordance with the invention can effectively treat spaces from about 700 square feet to 1200 square feet with ceiling heights of up to about 10 feet. The air purifier is preferably mounted at a central region of the ceiling structure in the space to be treated. In those situations where a larger space than can be cleaned by a single air cleaner apparatus is to be treated, the space is preferably divided into regions of approximately equivalent size, and an air purifier is centrally located within each region.

By way of example, a low-profile prototype air purifier apparatus was constructed having a length of 33", a width of 33", and a height of 9.75". The motors were of the single speed type and were rated at 115 volts, 7.2 amps and 865 watts. The motors provided quiet operation, at a rated sound level of 59 dBA at one meter. The air purifier provided an air flow rate of about 600 cubic feet per minute.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims, and their equivalents.

What is claimed is:

1. An air purifier apparatus providing a multi-directional air exhaust pattern so as to circulate and filter the air within a room, comprising:
   a base defining a plenum region and having a plurality of air inlet openings;
   a plurality of fan means for drawing air into said apparatus being located within said plenum region adjacent said air inlet openings;
   motor means for driving said fan means;
   relaying means for relaying electrical power to said motor means;
   baffles substantially surrounding each said fan means and defining an air channel therebetween including an air exhaust outlet, said air exhaust outlets being substantially equally spaced with respect to each other;
   a housing releasably secured to said base and having air intake openings;
   a plurality of filtering means for filtering the room air being mounted within said housing and exterior to said plenum region;
   means for sealing said filter means in surrounding relationship to said air inlet openings;
   wherein air being drawn through said air intake openings and said filtering means by said fan means is exhausted to the room through said air exhaust outlets.

2. The air purifier apparatus of claim 1, wherein said air exhaust outlets are substantially perpendicularly oriented with respect to each other.

3. The air purifier apparatus of claim 1, including a plurality of bracket means mounted to said base and extending outwardly therefrom, and means for securing said housing to said bracket means.

4. The air purifier apparatus of claim 1, wherein each of said filter means includes an HEPA filter element.

5. The air purifier apparatus of claim 4, wherein each of said filter means further includes a prefilter, each of said prefilters being positioned in a surrounding relationship to said HEPA filter elements.

6. The air purifier apparatus of claim 1, wherein said motor means including a plurality of motors, said motors being drivingly connected to each of said fan means.

7. The air purifier apparatus of claim 1, wherein said relaying means includes first and second electrical power inputs mounted to said base, said first electrical power input and said second electrical power input being electrically connected to said motor means.

8. The air purifier apparatus of claim 1, wherein said baffles include a first end adjacent said fan means and a second end adjacent said air exhaust outlets, said air channel progressively increasing in size between said first end and said second end of said baffles.

9. The air cleaner apparatus of claim 8, wherein said base includes upper and lower plates, said air inlet openings being through said lower plate, and said baffles extending between said upper and lower plates.

10. The air purifier apparatus of claim 9, wherein said baffles are arcuately shaped.

11. An air purifier apparatus providing a multi-directional air exhaust pattern so as to circulate and filter the air within a room, comprising:
    a base defining a plenum region and having a plurality of air inlet openings;
    a plurality of centrifugal fan means for drawing air into said apparatus being located within said plenum region and aligned with said air inlet openings;
    a separate motor means drivingly connected to each of said fan means;
    means for supplying electrical power to each of said motor means;
    arcuate baffles substantially surrounding said centrifugal fan means and defining an air channel therebetween including an air exhaust outlet, said air exhaust outlets being substantially equally spaced with respect to each other;
    a housing means for releasably securing said housing to said base, a plurality of air intake openings into said housing;
    a plurality of filters mounted within said housing and spaced with respect o one another exterior to said plenum region; and
    means for sealing said filters in surrounding relationship to said air inlet openings;
    wherein air is drawn through said air intake openings and said filters by said centrifugal fan means and exhausted to the room through said air exhaust outlets.

12. The air purifier apparatus of claim 11, further comprising prefilters positioned in a surrounding relationship to said filters.

13. The air purifier apparatus of claim 11, wherein said filters are HEPA filters.

14. The air purifier apparatus of claim 13, wherein said filters are generally cylindrical in configuration, and said motors being disposed within said filters.

15. The air purifier apparatus of claim 11, wherein said baffles include a first end adjacent said centrifugal fans and a second end adjacent said exhaust outlets, said baffles being arcuately shaped so that said air channels progressively increase in size from said first end to said second end of said baffles.

* * * * *